US010967985B2

(12) United States Patent
Emerson et al.

(10) Patent No.: US 10,967,985 B2
(45) Date of Patent: Apr. 6, 2021

(54) STARTUP OF A CATALYTIC INERTING SYSTEM WITH RECYCLE

(71) Applicant: Hamilton Sundstrand Corporation, Charlotte, NC (US)

(72) Inventors: Sean C. Emerson, Broad Brook, CT (US); Zissis A. Dardas, Worcester, MA (US); Robert R. Hebert, Storrs, CT (US); Allen Murray, Bloomfield, CT (US); Eric Surawski, Glastonbury, CT (US); Randolph Carlton McGee, Hamden, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 548 days.

(21) Appl. No.: 15/921,169

(22) Filed: Mar. 14, 2018

(65) Prior Publication Data
US 2019/0283895 A1 Sep. 19, 2019

(51) Int. Cl.
B64D 37/32 (2006.01)
B01D 53/26 (2006.01)

(52) U.S. Cl.
CPC .......... B64D 37/32 (2013.01); B01D 53/265 (2013.01)

(58) Field of Classification Search
CPC .... B01J 2219/00121; B01J 2219/00123; B01J 38/00; B01J 38/04; B01J 38/12; B01J 2219/00051; F28C 3/02; B64D 37/32; B01D 53/265; B01D 53/96; B01D 2251/11; B01D 2251/208
See application file for complete search history.

(56) References Cited

U.S. PATENT DOCUMENTS

| 3,258,508 | A | * | 6/1966 | La Fleur | F02C 1/10 432/29 |
| 3,847,298 | A | | 11/1974 | Hamilton | |
| 5,229,071 | A | * | 7/1993 | Meo, III | A61L 2/20 422/126 |
| 5,726,327 | A | * | 3/1998 | Acharya | C07B 41/00 549/256 |
| 6,002,019 | A | * | 12/1999 | Tamhankar | C07D 301/32 549/258 |
| 7,896,292 | B2 | | 3/2011 | Limaye et al. | |
| 8,828,344 | B2 | | 9/2014 | K-WLam et al. | |
| 9,102,416 | B1 | | 8/2015 | Cutler | |
| 2003/0134164 | A1 | * | 7/2003 | Reiser | H01M 8/04228 429/415 |
| 2008/0099618 | A1 | | 5/2008 | Zaki et al. | |

(Continued)

FOREIGN PATENT DOCUMENTS

EP 3279092 A1 2/2018

OTHER PUBLICATIONS

Extended European Search Report for EP Application No. 19161327.2, dated Jul. 2, 2019, 9 pages.

(Continued)

Primary Examiner — Timothy C Vanoy
(74) Attorney, Agent, or Firm — Kinney & Lange, P.A.

(57) ABSTRACT

A method for startup of a catalytic oxidation unit includes flowing air from an air source into the catalytic oxidation unit, recycling air from an outlet of the catalytic oxidation unit to an inlet of the catalytic oxidation unit through a recycle duct, and flowing a fuel from a fuel source into the catalytic oxidation to cause a catalytic reaction.

17 Claims, 7 Drawing Sheets

(56) References Cited

U.S. PATENT DOCUMENTS

2008/0128048 A1    6/2008   Johnson et al.
2014/0238501 A1    8/2014   Tichbome et al.

OTHER PUBLICATIONS

C. E. Baukal, "Gas Recircluation Systems", from <http://hedhme.com/content_map/?linkid=30029&article_id_15515>, 2019, 2 pages.
Communication Pursuant to Article 94(3) EPC for EP Application No. 19161327.2, dated Apr. 17, 2020, 4 pages.
Communication Pursuant to Article 94(3) EPC for EP Application No. 19161327.2, dated Sep. 18, 2020, 4 pages.
U.S. Appl. No. 15/629,367, filed Jun. 21, 2017, Entitled "Catalytic Oxidation Product Gas Management", 17 pages.
U.S. Appl. No. 15/849,165, filed Dec. 20, 2017, Entitled "Contaminant Removal for Catalytic Fuel Tank Inerting System", 23 pages.
U.S. Appl. No. 15/849,274, filed Dec. 20, 2017, Entitled "Catalytic Fuel Tank Inerting System", 24 pages.

\* cited by examiner

STARTUP OF A CATALYTIC INERTING SYSTEM WITH RECYCLE

BACKGROUND

The present disclosure relates generally to air inerting systems for aircraft and other applications where an inert gas may be required and, more specifically, to air inerting systems using catalytic oxidation.

Aircraft fuel tanks can contain potentially combustible combinations of oxygen, fuel vapors, and ignition sources. Commercial aviation regulations require actively managing the risk of explosion in the vapor space (i.e., ullage) above the liquid fuel in fuel tanks. This can be accomplished by reducing the oxygen concentration in the ullage by displacing the air in the ullage with an inert gas containing less than 12% oxygen. Conventional fuel tank inerting (FTI) methods include air separation module (ASM) methods that utilize hollow fiber membranes to separate ambient air into nitrogen-enriched air, which is directed to fuel tanks, and oxygen-enriched air, which is usually rejected overboard. AMS methods rely on bleed air from a compressor stage of an engine, which is not always available in the desired quantity at sufficient pressure thereby requiring aircraft engines to idle during descent.

SUMMARY

In one aspect, a method for startup of a catalytic oxidation unit includes flowing air from an air source into the catalytic oxidation unit, recycling air from an outlet of the catalytic oxidation unit to an inlet of the catalytic oxidation unit through a recycle duct, and flowing a fuel from a fuel source into the catalytic oxidation unit to cause a catalytic reaction.

In another aspect, a method for startup of a catalytic oxidation unit includes flowing a gaseous mixture of air and a fuel into a catalytic oxidation unit, initiating a catalytic reaction of the air and the fuel, producing an exhaust gas, and recycling the exhaust gas from an outlet of the catalytic oxidation unit to an inlet of the catalytic oxidation unit through a recycle duct. The ratio of the air to the fuel entering the catalytic oxidation unit is at a relative stoichiometric ratio of oxygen to fuel between 7 and 21.

In yet another aspect, an inert gas generating system includes an adjustable supply of air, an adjustable supply of fuel, a catalytic oxidation unit arranged to receive the air and fuel and including an inlet for receiving air and fuel and an outlet for delivering air and exhaust gas, wherein exhaust gas is a product of a reaction between the air and fuel. The system additionally includes a recycle duct fluidly connecting the inlet and the outlet of the catalytic oxidation unit and a controller configured to adjust at least one of the supply of fuel and the supply of air to the catalytic oxidation unit by way of one or more valves.

The present summary is provided only by way of example, and not limitation. Other aspects of the present disclosure will be appreciated in view of the entirety of the present disclosure, including the entire text, claims and accompanying figures.

Figure 1:
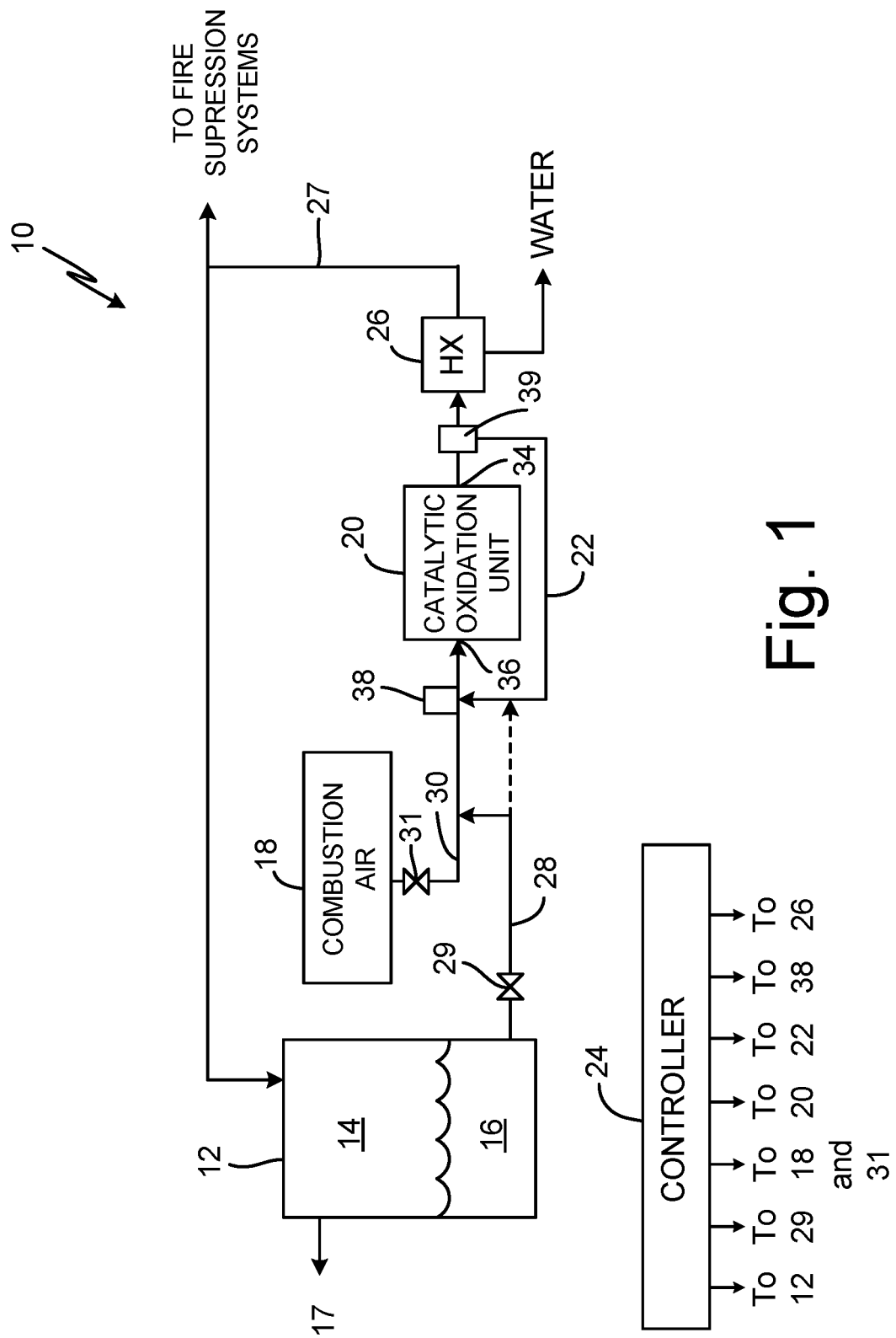
FIG. 1 is a schematic diagram of an inert gas generating system including a catalytic oxidation unit.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Catalytic oxidation of fuel is an alternative to traditional air separation modules (ASM) used to produce inert air onboard an aircraft for uses such as fuel tank inerting (FTI) and fire suppression. Catalytic oxidation of fuel can leverage a variety of incoming air sources, not limited to bleed air, to produce inert air with oxygen levels below the required 12% oxygen (or 9% for military engines) over a range of conditions. Catalytic reactors produce a significant amount of heat, which must be managed to prevent damage to the oxidizer system and to minimize any hazard to the aircraft.

In catalytic oxidation, a catalyst is used to catalyze a chemical reaction between oxygen ($O_2$) and fuel to produce carbon dioxide ($CO_2$) and water. Catalytic oxidation is an exothermic reaction, which can produce a significant amount of heat. The heat produced must be managed to prevent damage to the catalytic oxidation unit (COU), also referred to herein as a "reactor," and to minimize any hazard to the aircraft. One method to manage the heat within the COU is to recycle a portion of the reactor exhaust containing inert air back to the inlet of the COU. The exhaust gas can internally cool the reactor and minimize heat release within the reactor by reducing the amount of oxygen and fuel available for reaction, minimizing the difference between inlet and outlet reactant concentrations, and changing the residence time across the catalyst. A recycle or backmix reactor design can include an external device, such as a fan, blower, or ejector (jet pump) to move exhaust from the outlet of the COU back to the inlet of the COU. Alternatively, an impeller within the reactor can be used to cause internal recirculation of inert gas.

While the recycle of exhaust gas can be used to manage the amount of heat generated by the COU during operation, additional steps must be taken to manage heat production at startup or "light-off" of the COU. The present disclosure provides methods for managing heat production at startup for catalytic inerting systems with exhaust gas recycle.

FIG. 1 is a simplified schematic diagram of inert gas generating system 10, which can be present on-board an aircraft. Inert gas generating system 10 includes fuel tank 12, which includes ullage space 14 above liquid hydrocarbon fuel 16 and at least one vent 17, combustion air 18, COU 20 with recycle duct 22, and controller 24. Inert gas generating system 10, in accordance with the embodiments of the present disclosure, can produce a predominantly inert gas by mixing hydrocarbon fuel 16 and a source of oxygen, such as combustion air 18, in the presence of a catalyst (i.e., COU 20). Reaction of hydrocarbon fuel 16 and combustion air 18 produces carbon dioxide and water vapor. The water vapor can be condensed from the exhaust gas exiting COU 20, for example, by heat exchanger 26. The carbon dioxide is an inert gas that is mixed with nitrogen naturally found in fresh/ambient air, and which flows through COU 20 unreacted. The inert gas can be directed back to fuel tank 12 through line 27 to displace gas in ullage 14 and/or can be directed to fire suppression systems. Controller 24 can be operatively coupled (e.g., electrically and/or communicatively) to components shown in FIG. 1 as well as components not depicted (e.g., valves, sensors, etc.) to control operation of inert gas generating system 10.

Liquid fuel 16 can be kerosene-based jet fuel, such as Jet-A, Jet-A1, or Jet-B fuel. For military applications, liquid fuel 16 can also be a jet propulsion "JP" class fuel, such as JP-5 or JP-8. Other types of fuel such as diesel, gasoline, and mixtures of fuels are also contemplated herein. Ullage space 14, which is a vapor space present above liquid fuel 16 in fuel tank 12, can contain potentially combustible fuel vapors. System 10 operates to reduce the risk of combustion and explosion within ullage space 14 by providing inert gas to maintain the oxygen concentration within ullage space 14 at or below 12% oxygen by volume for commercial aviation, and below 9% by volume for military applications.

A portion of hydrocarbon fuel 16 can be extracted from fuel tank 12 and delivered to COU 20 via fuel supply line 28. Delivery of fuel 16 to COU 20 can be controlled by one or more valves 29. Hydrocarbon fuel vapor 16 is mixed with combustion air 18 prior to entering COU 20 (i.e., upstream of COU 20) for reaction in COU 20. In some embodiments, liquid fuel 16 can be directly injected into a gas supply line entering COU 20 (e.g., combustion air supply line 30 or recycle duct 22) through a fuel injector capable of atomizing fuel 16 for mixture with combustion air 18. In alternative embodiments, hydrocarbon fuel vapors 16 in ullage 14 can be separated from a gaseous mixture in ullage 14 or hydrocarbon fuel vapor 16 can be produced from liquid fuel 16 in an evaporator container (not shown). Hydrocarbon fuel vapor 16 can be delivered to COU 20 in combination with combustion air 18 through a gas supply line, such as combustion air supply line 30 or recycle duct 22. In some embodiments, an additional mixer, such as an ejector or jet pump, can be used to produce a gaseous mixture of fuel 16 and combustion air 18 for delivery to COU 20.

Combustion air 18 provides a source of oxygen for reaction with hydrocarbon fuel 16 in COU 20. Combustion air 18 can be supplied by one or more air sources including, but not limited to, fan bleed air, ram air, cabin outflow air, and compressor bleed air. Combustion air 18 can be supplied to COU 20 through supply line 30. Delivery of combustion air 18 can be controlled by one or more valves 31. In some embodiments, combustion air 18 can be cooled or heated via a heat exchanger or source of heat as known in the art to obtain an optimal inlet gas temperature for reaction in COU 20. In some embodiments, a temperature of the gaseous mixture of fuel 16 and combustion air 18 at a COU 20 inlet is between 150° C. and 225° C., but this temperature can vary depending on the type of catalyst used.

COU 20 contains a catalyst capable of inducing a chemical reaction between hydrocarbon fuel 16 and combustion air 18. The catalyst material can include, but is not limited to, a noble metal, transition metal, metal oxide, and combinations thereof. The catalyst in COU 20 induces a chemical reaction between hydrocarbon fuel 16 and combustion air 18, which produces exhaust gas 32 containing carbon dioxide, water, and any unreacted gases. The reaction is exothermic and, therefore, can also generate a significant amount of heat depending on the amount of reactants available for reaction. The chemical reaction for a stoichiometric mixture of fuel and air has a general formula of:

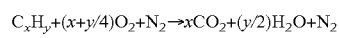

$$C_xH_y + (x+y/4)O_2 + N_2 \rightarrow xCO_2 + (y/2)H_2O + N_2$$

The exact reactions depend on the type of fuel used and types of hydrocarbons present in the fuel mixture. For a stoichiometric mixture, the reaction results in complete consumption of oxygen and hydrocarbons to produce an inert gas containing carbon dioxide, water, and nitrogen, which exits COU 20 through outlet 34. Any inert gas species (e.g., carbon dioxide, water, and nitrogen) that enter COU 20 in the gaseous mixture of hydrocarbon fuel 16 and combustion air 18 will not react and will thus pass through COU 20 chemically-unchanged. If an air-to-fuel ratio (ratio of combustion air 18 to fuel 16) is greater than stoichiometry, or having a relative stoichiometric ratio greater than 1, more oxygen than needed for reaction of hydrocarbons will enter COU 20. Any unreacted oxygen will exit COU 20 in exhaust gas 32 (shown in FIGS. 2-4). Ideally, the gas returned to fuel tank 12 for inerting of ullage space 14 or directed to fire suppression systems has a minimal or near-zero concentration of oxygen for maximum inerting effect. This requires a near-stoichiometric air-to-fuel ratio.

Unfortunately, reaction of fuel 16 and combustion air 18 at near-stoichiometric conditions can result in significant heat release, which can damage COU 20. The amount of heat produced can be managed and reduced by recycling a portion of exhaust gas 32 through recycle duct 22 back to COU 20. Although depicted as a single duct in FIG. 1, recycle duct 22 can include any number of channels capable of recycling exhaust gas 32 back to COU 20. In some embodiments, multiple exhaust ducts 22 may be used to direct exhaust gas 32 to different portions of supply line 30 in order to improve mixing of exhaust gas 32 with fuel 16 and combustion air 18 upstream of COU 20. As shown in FIG. 1, exhaust gas 32 can enter a supply line, such as combustion air supply line 30, carrying both fuel 16 and combustion air 18, for mixing prior to entering COU 20 at inlet 36. In some embodiments, exhaust gas entering recycle duct 22 has the same chemical composition as that exiting COU 20. In alternative embodiments, water in exhaust gas 32 can be condensed and removed prior to entering recycle duct 22. As shown in FIG. 1, heat exchanger 26 is located downstream of recycle duct 22 to remove water from exhaust gas 32 before exhaust gas 32 is directed to fuel tank 12 and fire suppression systems. However, heat exchanger 26 can alternatively be located upstream of recycle duct 22 to remove water prior to recycle. No harm to the catalyst is caused by water entering COU 20 and, therefore, it is not necessary to remove water from exhaust gas 32 entering recycle duct 22. In fact, in some embodiments, water itself, which has been condensed and separated from exhaust gas 32, can be recycled back to COU 20 without the additional inert gases ($CO_2$ and $N_2$). Although the present invention refers to exhaust gas as that gas exiting COU 20 at outlet 34, it will be understood by one of ordinary skill in the art that any one or combination of inert chemical constituents of exhaust gas 32 (e.g., $CO_2$, $N_2$, and water) can be recycled through recycle duct 22 to manage heat generation in COU 20. Operation of COU 20 at a safe temperature for near stoichiometric conditions is achievable regardless of the chemical composition of exhaust gas 32.

Exhaust gas 32 dilutes the gaseous mixture of fuel 16 and combustion air 18 entering COU 20 with inert gases and thereby reduces the concentration of reactants (hydrocarbons and $O_2$) available for catalytic reaction, minimizing the difference between inlet and outlet reactant concentrations, and changes the residence time across the catalyst. Because the inert gases present in exhaust gas 32 do not react with the catalyst, no heat is generated by this portion of exhaust gas 32 flowing into and through COU 20. The inert gas passes through COU 20 chemically unchanged, although it can absorb heat generated in COU 20 by the reaction of fuel 16 and combustion air 18.

Inert gas generating system 10 can include one or more pumps or blowers 38, 39 arranged to force a portion of exhaust gas 32 through recycle duct 22 for recycling through COU 20. Additionally, one or more valves (not shown) can be used to control a volume exhaust gas 32 diverted through recycle duct 22 to COU 20. In some embodiments, an ejector or pump 38 can be located upstream of COU 20 to draw exhaust gas 32 through recycle duct 22. In alternative embodiments, blower 39 can be arranged downstream COU 20 and configured to draw off and blow a portion of exhaust gas 32 from outlet 34 and through recycle duct 22. Controller 24 can be arranged to control an amount of exhaust gas 32 that is recycled as compared to an amount that is supplied to ullage 14 and/or fire suppression systems.

Exhaust gas 32 can be recycled at any given or predetermined ratio or percentage. In a non-limiting example, 95% of exhaust gas 32 may be recycled with only 5% being directed to ullage 14 or fire suppression systems. Alternatively, 5% of exhaust gas may be recycled with 95% being directed to ullage 14 or fire suppression systems. These values are merely examples. The amount of exhaust gas 32 recycled can be varied depending on a number of factors, including but not limited to, the temperature of COU 20. Once in operation, the amount of exhaust gas 32 recycled can be set as necessary to manage heat generation. Additional steps are required to prevent the overheating or heat generation in COU 20 at startup or "light off." By managing the recycle of exhaust 32 and air-to-fuel ratio entering COU 20, low startup and operating temperatures can be achieved thereby preventing damage to the catalyst and/or COU 20. Recycle of exhaust gas 32 can allow COU 20 to startup and operate below the autoignition temperature of fuel 16. Additionally, lower startup and operating temperatures can expand the choice of materials available for construction of COU 20, including catalyst materials.

Figure 2:
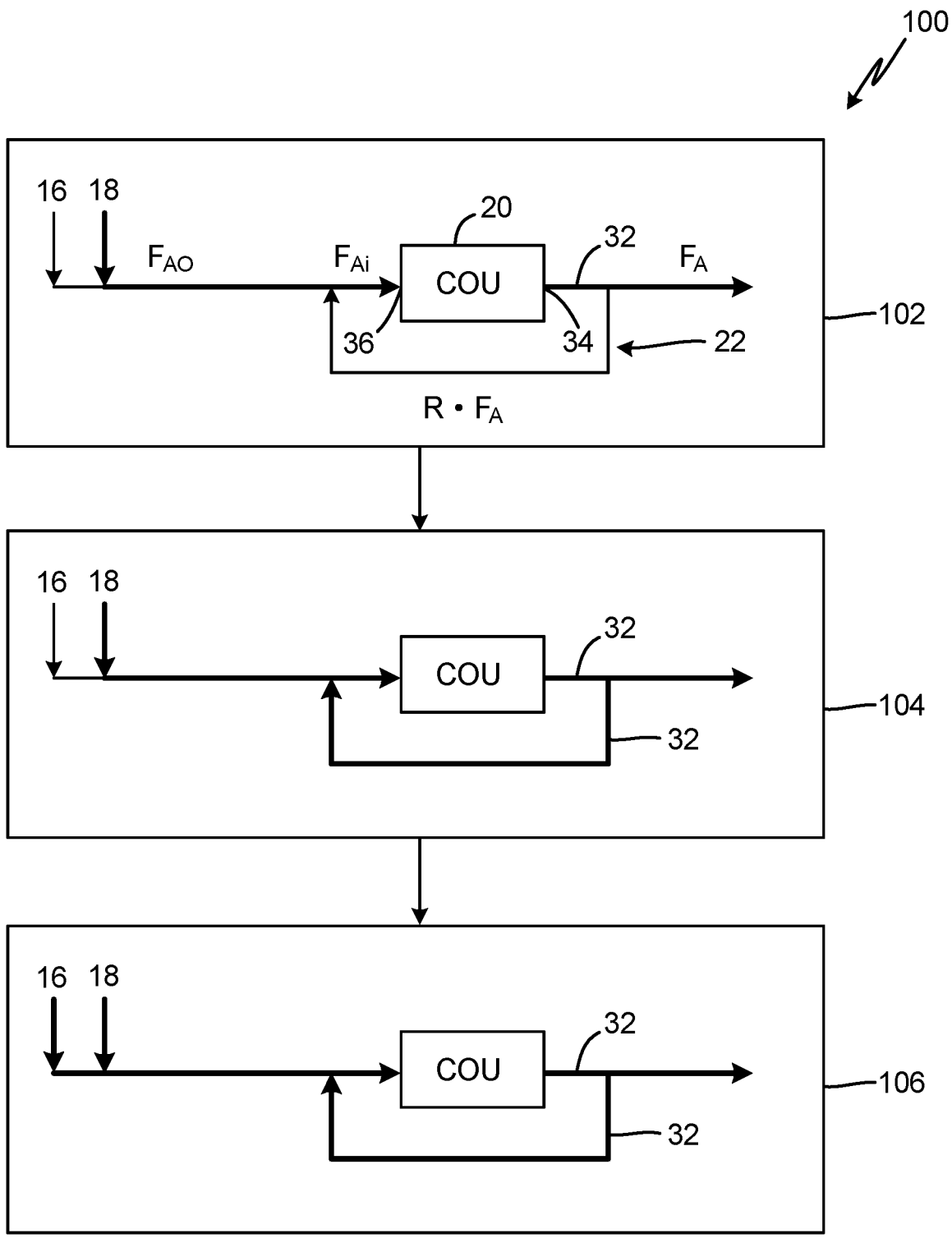
FIG. 2 is a schematic of a subset of the inert gas generating system of FIG. 1, operating according to one mode for startup of the catalytic oxidation unit of FIG. 1.
Figure 3:
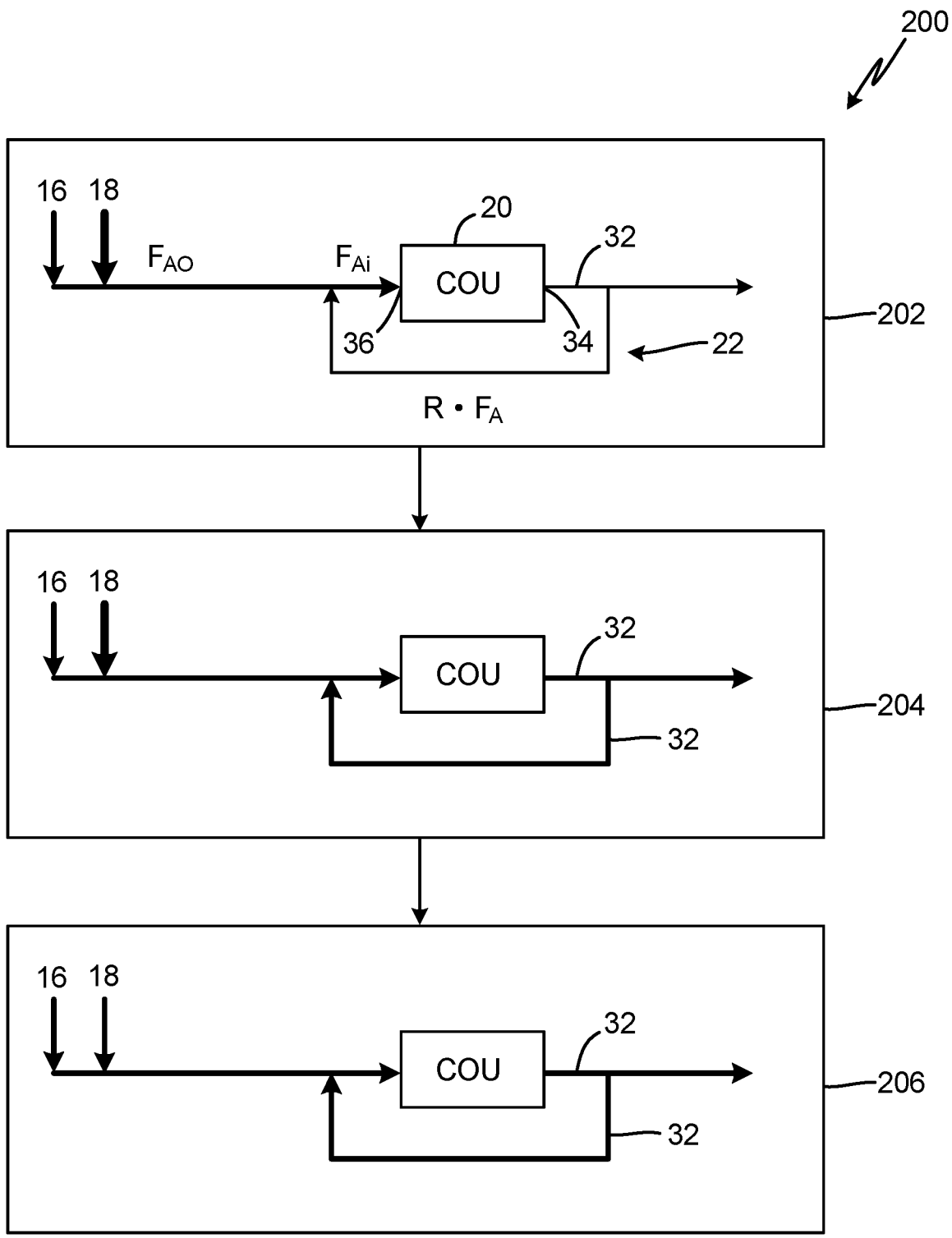
FIG. 3 is a schematic of a subset of the inert gas generating system of FIG. 1, operating according to another mode for startup of the catalytic oxidation unit of FIG. 1.
Figure 4:
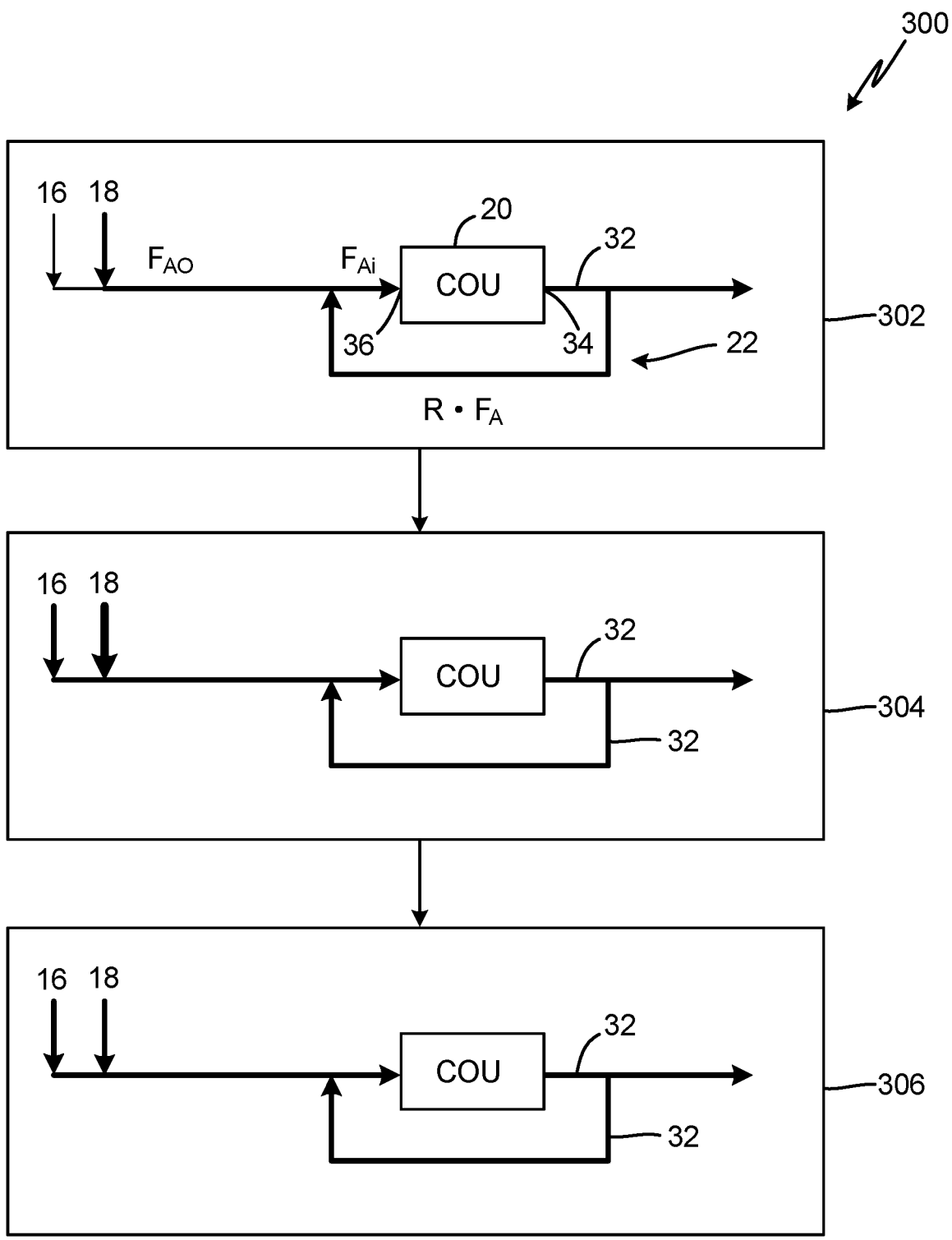
FIG. 4 is a schematic of a subset of the inert gas generating system of FIG. 1, operating according to yet another mode for startup of the catalytic oxidation unit of FIG. 1.
Figure 5:
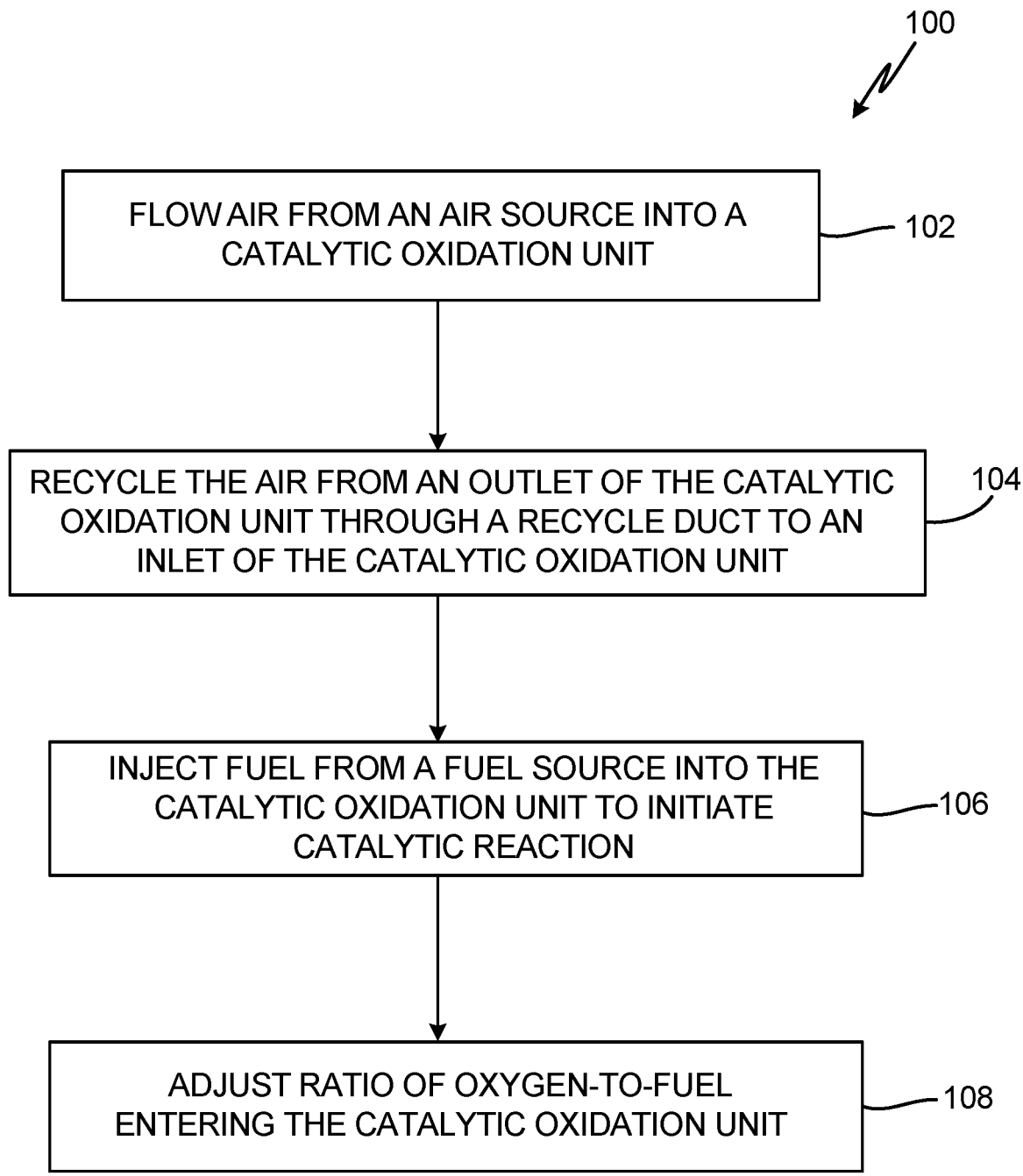
FIG. 5 is a flow chart of the method of FIG. 2.
Figure 6:
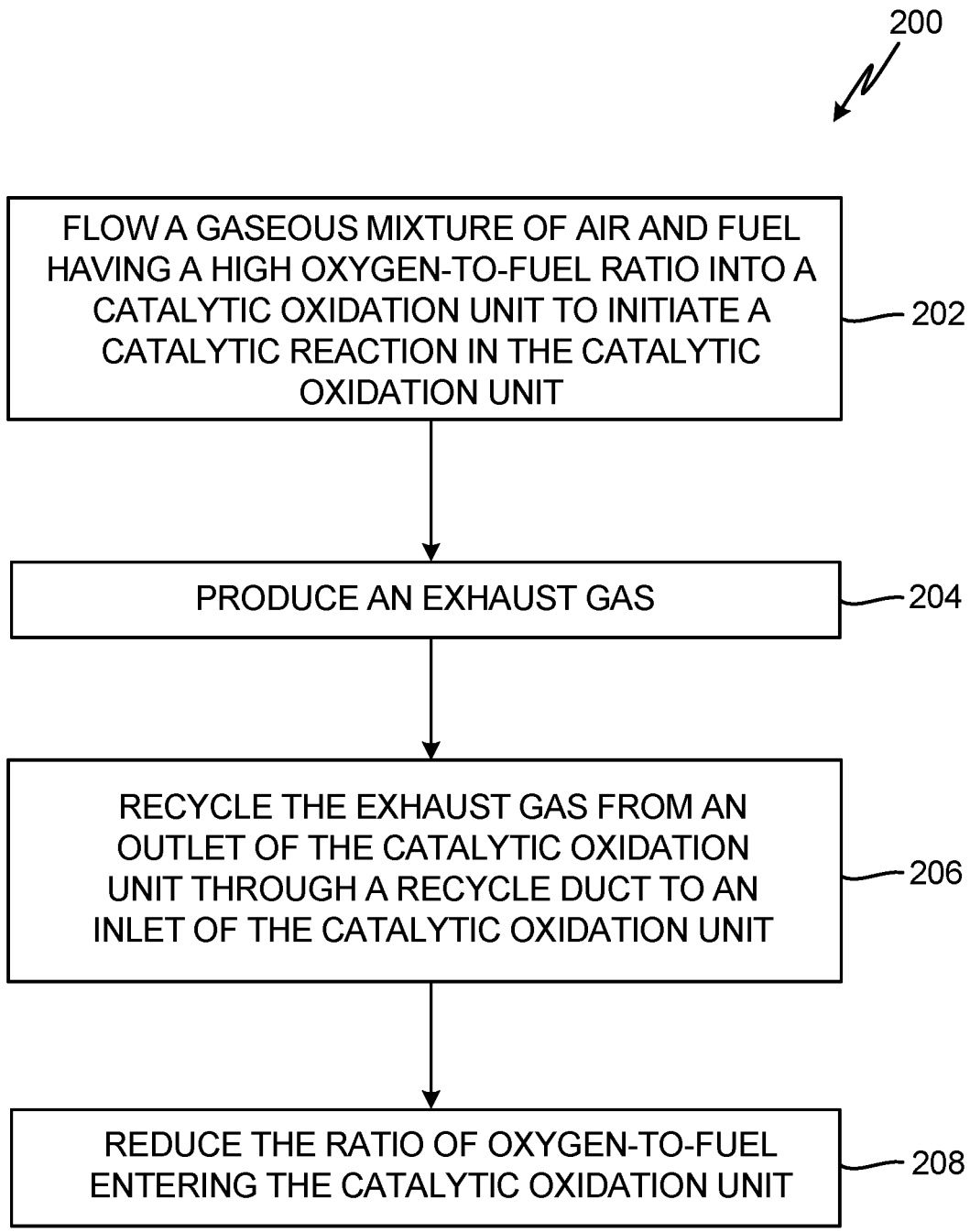
FIG. 6 is a flow chart of the method of FIG. 3.
Figure 7:
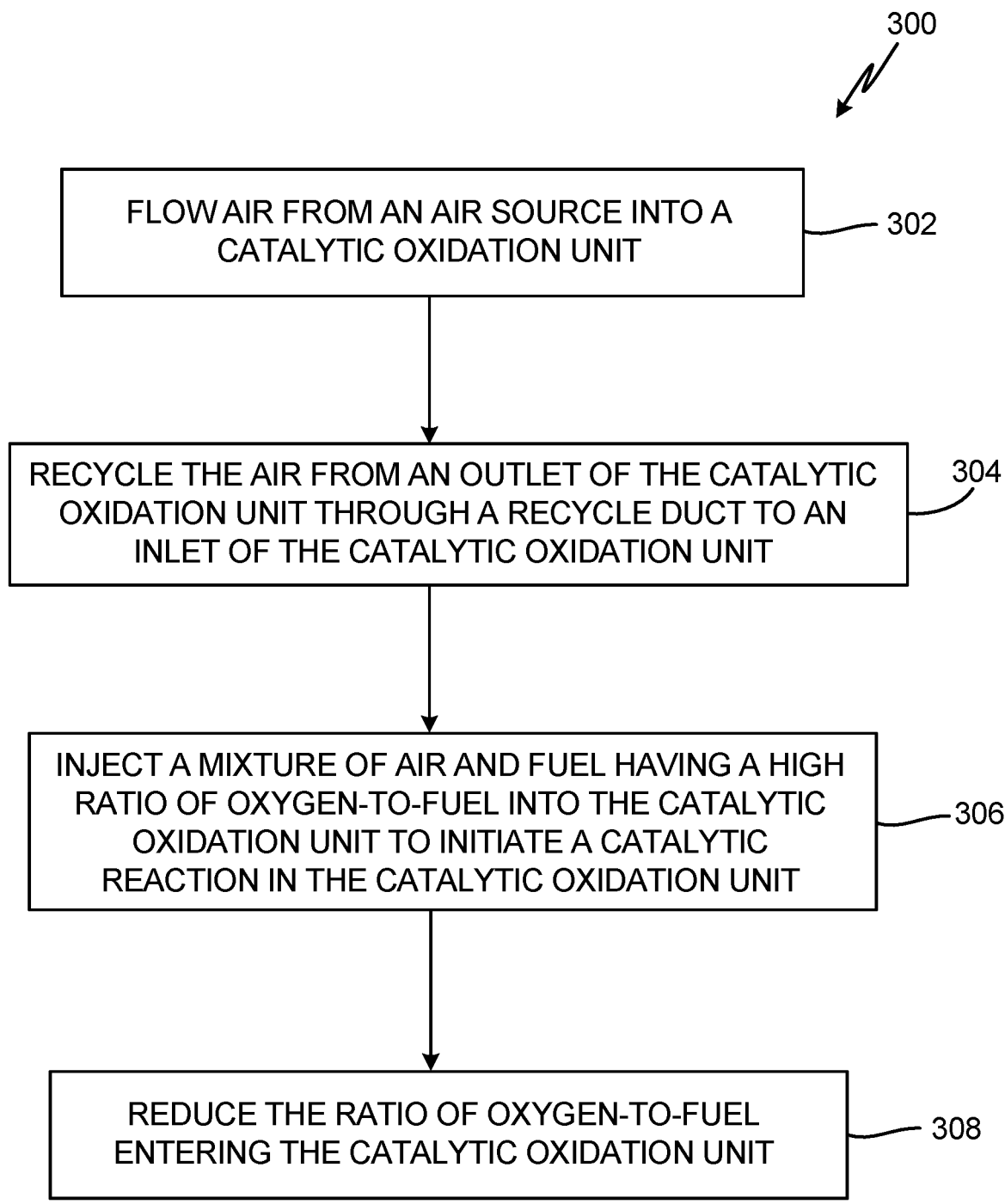
FIG. 7 is a flow chart of the method of FIG. 4.

FIGS. 2-4 provide schematic diagrams of a first, second, and third modes 100, 200, 300 of COU 20 startup, respectively. FIGS. 5-7 provide method flow charts of the first, second, and third modes 100, 200, 300 of COU 20 startup illustrated in FIGS. 2-4. FIGS. 2-4 each show COU 20 with inlet 36 and outlet 34. Fuel 16 and combustion air 18 enter COU 20 at inlet 36. Bold lines are used to indicate active flow of fuel 16, combustion air 18, and exhaust gas 32. Differences in line thickness for combustion air 18 indicates higher and lower air-to-fuel ratios (thicker lines indicate increased air delivery to COU 20). The air-to-fuel ratio can be controlled by controller 24 and valves 29 and 31. Fuel 16 and combustion air 18 undergo catalytic oxidation in COU 20 to produce an inert gas containing $CO_2$, $N_2$, and water. The inert gas and any remaining unreacted combustion air 18 exits COU 20 at outlet 34 as exhaust gas 32. The combination of inert and unreacted combustion air 18 exiting COU 20 is collectively referred herein as exhaust gas 32. A portion of exhaust gas 32 is diverted from outlet 34 through recycle duct 22, which fluidly connects outlet 34 and inlet 36 of COU 20 to deliver a portion of exhaust gas 32 back to COU 20. As will be further described, in some modes of startup, combustion air 18, alone, can be passed through COU 20 unreacted and recycled back to inlet 36 through recycle duct 22.

A flow rate ($R \times F_A$) of exhaust 32 through recycle duct 22 can be set to control the proportion of exhaust gas 32 recycled back to COU 20, where $F_A$ is the flow rate of exhaust 32 at COU outlet 34 and R is the recycle ratio relative to $F_A$ that is recycled. As previously discussed with respect to FIG. 1, the exhaust gas flow rate can be increased by pump or blower 38, 39, used to force exhaust gas 32 through recycle duct 22. As shown in FIGS. 2-4, the gaseous mixture of fuel 16 and combustion air 18 (or combustion air 18 alone) has an inlet flow rate $F_{A0}$, which can be adjusted by the exhaust flow rate ($R \times F_A$) entering from recycle duct 22 to provide a flow rate $F_{Ai}$ into COU 20 at inlet 36. $F_{Ai}$ is the sum of the inlet flow rate $F_{A0}$ and the exhaust flow rate ($R \times F_A$). The fraction of exhaust gas 32 recycled in terms of recycle ratio R can be determined by:

$$\alpha = R/R+1$$

When R is equal to zero, no exhaust gas 32 is recycled through recycle duct 22; whereas, for example, when R is equal to 1, 50% of exhaust gas 32 is recycled; when R is equal to 60, approximately 98% of exhaust gas 32 is recycled. The recycling of exhaust gas 32 can dilute the gaseous mixture of fuel 16 and combustion air 18 entering COU 20 thereby reducing the heat generated by COU 20 by reducing the amount of reactants available for reaction, minimizing the difference between inlet and outlet reactant concentrations, and changing the residence time across the catalyst. The stoichiometric air-to-fuel ratio can also be adjusted to manage heat generation in COU 20. As used herein, the air-to-fuel ratio refers to the relative stoichiometric ratio of oxygen to fuel. When the stoichiometric oxygen-to-fuel ratio is equal to 1, there is just enough oxygen available for complete combustion (i.e., complete consumption of hydrocarbons and oxygen). As previously discussed, a significant amount of heat is generated when the oxygen-to-fuel ratio is equal to 1. To reduce heat generation, the air-to-fuel ratio can be increased, making more oxygen available than needed, which can absorb heat generated and ultimately reduce the amount of heat that can be generated by reaction and thereby the gas temperature in COU 20. The amount of exhaust gas recycled through COU 20 and the air-to-fuel ratio can be controlled by controller 24.

Generally, catalytically produced inert gases have a temperature range between 150° C. and 1500° C. Temperatures reaching 1500° C. can damage COU 20 and can present a hazard to the aircraft. Without heat management at startup, the temperature of COU 20 for a stoichiometric mixture can easily reach 1500° C. Unless exhaust gas 32 is cooled (e.g., by heat exchanger 26) prior to recycle, temperatures within COU 20 will not be able to be managed without additional cooling of COU 20. The disclosed startup modes are capable of producing exhaust gas 32 with a temperature below 230° C., which is at or below the autoignition temperature of fuel 16. At this temperature, exhaust gas 32 does not require further cooling prior to returning to fuel tank 12.

FIG. 2 illustrates a first mode 100 of COU 20 start up. The corresponding method flow chart is provided in FIG. 5. In startup mode 100, heat generation at startup is managed by establishing combustion airflow through COU 20 before fuel 16 is injected for reaction. In step 102, combustion air 18 is first directed through COU 20 with a flow rate $F_{A0}$. The flow into COU 20 consists of only combustion air 18 without fuel 16. In this case, the air-to-fuel ratio is equal to infinity as there are no hydrocarbon reactants present in the inlet gas stream. Combustion air exiting COU 20 as exhaust gas 32 can be directed to fuel tank 12 or exhausted (e.g., dumped overboard) as non-usable for inerting applications. After combustion airflow through COU 20 has been established, recycle duct 22 is opened to divert exhaust gas 32 (i.e., combustion air 18) back to COU 20 (step 104). The recycle ratio R is preferably equal to or greater than 20, meaning at least 95% of exhaust gas 23 (i.e., combustion air 18) is being recycled through COU 20. The exhaust flow rate ($R \times F_A$) is greater than the combustor air flow rate $F_{AO}$. The exhaust flow rate ($R \times F_A$) adds velocity to the combustor air flow rate $F_{AO}$ thereby increasing inlet flow rate $F_{Ai}$ at COU 20. After the recycle flow has been established, fuel 18 is injected into COU 20 for reaction with combustor air 18. As previously discussed, fuel vapor extracted from ullage 14 or produced from liquid fuel 18 can be mixed with combustion air 18 upstream of COU 20. Alternatively, fuel 18 can be directly injected into combustor air supply line 30 or recycle duct 22 for mixing with combustion air 18 upstream of COU 20. The gaseous mixture of fuel 16 and combustion air 18 has a stoichiometric oxygen-to-fuel ratio of equal to or greater than 1, and preferably less than 7. The recycle ratio R is preferably equal to or greater than 20. Heat generation is lowered at startup by establishing combustion airflow through COU 20 with recycle prior to fuel injection, as the excess combustion air 18 present in COU 20 upon startup absorbs heat. Following reaction or startup, the stoichiometric oxygen-to-fuel ratio can remain approximately unchanged (i.e., within the range of 1 to 7) to produce exhaust gas 32 with an oxygen concentration below 12%, while managing heat generation. The recycle duct 22 can remain open to allow for continued recycle of exhaust gas 32. The recycle ratio R can remain above zero and preferably equal to or greater than 20.

FIG. 3 illustrates a second mode 200 of COU 20 start up. The corresponding method flow chart is provided in FIG. 6. In startup mode 200, heat generation is managed at startup by injecting a high air-to-fuel ratio into COU 20. In step 202, a gaseous mixture of fuel 16 and combustion air 18 with high a high stoichiometric oxygen-to-fuel ratio is directed through COU 20 with a flow rate $F_{AO}$. As previously discussed, fuel vapor extracted from ullage 14 or produced from liquid fuel 18 can be mixed with combustion air 18 upstream of COU 20. Alternatively, fuel 18 can be direct injected into combustor air supply line 30 for mixing with combustion air 18 upstream of COU 20. To reduce heat generation at startup, the oxygen-to-fuel ratio is greater than 1 and, preferably, between 7 and 21. Fuel 16 and combustion air 18 react in COU 20 to cause COU 20 startup or "light off." Following startup, a portion of exhaust gas 32, containing inert gas plus any unreacted combustion air 18, is recycled through recycle duct 22 back to inlet 36 of COU 20 (step 204). The recycle ratio R is preferably equal to or greater than 20, meaning at least 95% of exhaust gas 23 is being recycled through COU 20. The exhaust flow rate ($R \times F_A$) is greater than air and fuel flow rate $F_{AO}$. The exhaust flow rate ($R \times F_A$) adds velocity to the air and fuel flow rate $F_{AO}$ thereby increasing inlet flow rate $F_{Ai}$ at COU 20. Following startup, the stoichiometric oxygen-to-fuel ratio can be reduced to achieve an oxygen concentration in exhaust gas 32 below 12% (step 206). The adjusted stoichiometric oxygen-to-fuel ratio can be equal to or greater than 1, and preferably less than 7. The recycle duct 22 can remain open to allow for continued recycle of exhaust gas 32 and heat management. Recycle of exhaust gas 32 can continue with the recycle ratio R preferably equal to or greater than 20 for continuous heat management.

FIG. 4 illustrates a third mode 300 of COU 20 start up. The corresponding method flow chart is provided in FIG. 7. In startup mode 300, heat generation at startup is managed by establishing combustion airflow through COU 20 without fuel 16, followed by injection of a high air-to-fuel ratio into COU 20 for startup reaction. In step 302, combustion air 18 is directed through COU 20 with a flow rate $F_{AO}$. The flow into COU 20 consists of only combustion air 18 without fuel 16. In this case, the air-to-fuel ratio is equal to infinity as there are no hydrocarbon reactants present in the inlet gas stream. At least a portion of combustion air exiting COU 20 as exhaust gas 23 is recycled back to COU 20 inlet by recycle duct 22. The recycle ratio R is preferably equal to or greater than 20, meaning at least 95% of exhaust gas 23 (i.e., combustion air 18) is being recycled through COU 20. The portion of combustion air 18 not recycled through recycle duct 22 can be directed to fuel tank 12 or exhausted (e.g., dumped overboard) as non-usable for inerting applications. The exhaust flow rate ($R \times F_A$) is greater than the combustor air flow rate $F_{AO}$. The exhaust flow rate ($R \times F_A$) adds velocity to the combustor air flow rate $F_{AO}$ thereby increasing inlet flow rate $F_{Ai}$ at COU 20. After the recycle flow has been established, fuel 18 is injected into COU 20 for reaction with combustor air 18 in an amount sufficient to produce a high air-to-fuel ratio at inlet 36 of COU 20 (step 304). As previously discussed, fuel vapor extracted from ullage 14 or produced from liquid fuel 18 can be mixed with combustion air 18 upstream of COU 20. Alternatively, fuel 18 can be direct injected into combustor air supply line 30 or recycle duct 22 for mixing with combustion air 18 upstream of COU 20. The gaseous mixture of fuel 16 and combustion air 18 has a stoichiometric oxygen-to-fuel ratio of equal to or greater than 1, and preferably between 7 and 21 at startup. The recycle ratio R is preferably equal to or greater than 20. Heat generation is lowered both by establishing combustion airflow through COU 20 with recycle prior to fuel injection and by injecting a high air-to-fuel ratio and by injecting a high air-to-fuel ratio into COU 20. The excess combustion air 18 present in COU 20 upon startup absorbs heat. Following reaction or startup, the stoichiometric oxygen-to-fuel ratio is reduced to produce exhaust gas 32 with oxygen concentration below 12%, while managing heat generation in COU 20 (step 306). The adjusted oxygen-to-fuel ratio is greater than 1 and preferably less than 7. Recycling duct 22 can remain open to allow for continuous recycle of exhaust gas 32 with the recycle ratio R remaining above zero and preferably equal to or greater than 20.

Any of the disclosed modes 100, 200, and 300 for COU 20 startup, and including combinations thereof, can be used to manage heat generation at startup in a COU 20 with exhaust gas recycle. System 10 can move between different modes 100, 200, and 300 for COU 20 startup during operation if there is a need to start system 10 multiple times. For an active catalyst, system 10 will light-off and approach steady-state faster using mode 100. From a thermal management perspective, mode 300 provides a slower, safer approach to light-off, while mode 200 may be preferred if a re-light-off is needed due to a recycle blower restart. In a non-limiting example, COU 20 can be started up under mode 100. If the recycle blower needs to shut down and restart during operation, COU 20 can start again under mode 100 or 300, but it may be more practical to restart under mode 200. The use of the disclosed startup modes 100, 200, and 300 can allow for continuous heat management of COU 20 during operation without additional cooling of COU 20 or recycled exhaust gas 32.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A method for startup of a catalytic oxidation unit includes flowing air from an air source into the catalytic oxidation unit, recycling air from an outlet of the catalytic oxidation unit to an inlet of the catalytic oxidation unit through a recycle duct, and flowing a fuel from a fuel source into the catalytic oxidation unit, wherein flowing the fuel causes a catalytic reaction.

The method of the preceding paragraph can optionally include, additionally and/or alternatively, any one or more of the following features, configurations, additional components, and/or steps:

The method of the preceding paragraph, wherein air can be recycled to establish an air flow through the catalytic oxidation unit and wherein flowing fuel into the catalytic oxidation unit occurs after the air flow has been established.

The method of any of the preceding paragraphs, wherein a ratio of the air to the fuel entering the catalytic oxidation unit can be at relative stoichiometric ratio of oxygen to fuel between 1 and 7.

The method of any of the preceding paragraphs, wherein a ratio of the air to the fuel entering the catalytic oxidation unit can be at relative stoichiometric ratio of oxygen to fuel between 7 and 21.

The method of the preceding paragraph can further include reducing the flow of the fuel such that a ratio of the air to the fuel entering the catalytic oxidation unit is at a relative stoichiometric ratio of oxygen to fuel between 1 and 7.

The method of any of the preceding paragraphs, wherein the air and fuel can flow into a catalytic oxidation unit as a gaseous mixture at a relative stoichiometric ratio of oxygen to fuel between 7 and 21 and wherein the air is recycled as a portion of an exhaust gas produced by the catalytic reaction.

The method of the preceding paragraph can further include reducing the ratio of the air to the fuel entering the catalytic oxidation unit to a relative stoichiometric ratio of oxygen to fuel between 1 and 7.

The method of any of the preceding paragraphs can further include injecting the fuel into the recycle duct.

The method of any of the preceding paragraphs can further include mixing the fuel with the air upstream of the catalytic oxidation unit.

The method of any of the preceding paragraphs, wherein the catalytic reaction can produce an exhaust gas that exits the catalytic oxidation unit through the outlet, which is a chemical product of catalytic oxidation.

The method of any of the preceding paragraphs, wherein the exhaust gas can have a temperature less than 230 degrees Celsius to cool the catalytic oxidation unit.

The method of any of the preceding paragraphs, wherein a portion of the exhaust gas can be diverted through the recycle duct to the inlet of the catalytic oxidation unit.

The method of any of the preceding paragraphs, wherein a recycle ratio relative to a flow rate of the exhaust gas can be equal to or greater than 20.

A method for startup of a catalytic oxidation unit includes flowing a gaseous mixture of air and a fuel into a catalytic oxidation unit, wherein a ratio of the air to the fuel entering the catalytic oxidation unit is at a relative stoichiometric ratio of oxygen to fuel between 7 and 21, initiating a catalytic reaction of the air and the fuel, producing an exhaust gas, and recycling the exhaust gas from an outlet of the catalytic oxidation unit to an inlet of the catalytic oxidation unit through a recycle duct.

The method of the preceding paragraph can optionally include, additionally and/or alternatively, any one or more of the following features, configurations, additional components, and/or steps:

The method of the preceding paragraph can further include reducing the ratio of the air to the fuel entering the catalytic oxidation unit to a relative stoichiometric ratio of oxygen to fuel between 1 and 7.

The method of any of the preceding paragraphs, wherein the exhaust gas can have a temperature below 230 degrees Celsius to cool catalytic oxidation unit The method of any of the preceding paragraphs, wherein a portion of the exhaust gas can be recycled.

The method of any of the preceding paragraphs, wherein a recycle ratio relative to a flow rate of the exhaust gas is equal to or greater than 20.

An inert gas generating system includes an adjustable supply of air, an adjustable supply of fuel, a catalytic oxidation unit arranged to receive the air and fuel and including an inlet for receiving air and fuel and an outlet for delivering air and exhaust gas, wherein exhaust gas is a product of a reaction between the air and fuel. The system additionally includes a recycle duct fluidly connecting the inlet and the outlet of the catalytic oxidation unit and a controller configured to adjust at least one of the supply of fuel and the supply of air to the catalytic oxidation unit by way of one or more valves.

The system of the preceding paragraph can optionally include, additionally and/or alternatively, any one or more of the following features, configurations, additional components, and/or steps:

The system of the preceding paragraphs, wherein the system can be configured to recycle only air during startup of the catalytic oxidation unit.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for startup of a catalytic oxidation unit for an aircraft gas inerting system, the method comprising:
continuously flowing air from an air source into the catalytic oxidation unit;
recycling at least a portion of the air from an outlet of the catalytic oxidation unit to an inlet of the catalytic oxidation unit through a recycle duct;
flowing a fuel from a fuel tank into the catalytic oxidation unit, wherein flowing the fuel initiates a catalytic reaction and produces an exhaust gas comprising a chemical product of catalytic oxidation, and wherein the exhaust gas exits the catalytic oxidation unit through the outlet; and
directing a portion of the exhaust gas to an ullage space of the fuel tank;
wherein the air is recycled to establish an air flow through the catalytic oxidation unit and wherein flowing fuel into the catalytic oxidation unit occurs after the air flow has been established.

2. The method of claim 1, wherein a ratio of the air to the fuel entering the catalytic oxidation unit is at relative stoichiometric ratio of oxygen to fuel between 1 and 7.

3. The method of claim 1, wherein a ratio of the air to the fuel entering the catalytic oxidation unit is at relative stoichiometric ratio of oxygen to fuel between 7 and 21.

4. The method of claim 3 and further comprising reducing the flow of the fuel such that a ratio of the air to the fuel entering the catalytic oxidation unit is at a relative stoichiometric ratio of oxygen to fuel between 1 and 7.

5. The method of claim 1, wherein the air and fuel flow into a catalytic oxidation unit as a gaseous mixture at a relative stoichiometric ratio of oxygen to fuel between 7 and 21 and wherein the air is recycled as a portion of the exhaust gas produced by the catalytic reaction.

6. The method of claim 5 and further comprising:
reducing the ratio of the air to the fuel entering the catalytic oxidation unit to a relative stoichiometric ratio of oxygen to fuel between 1 and 7.

7. The method of claim 1 and further comprising:
injecting the fuel into the recycle duct, wherein the fuel is a liquid hydrocarbon fuel and wherein injecting the fuel comprises atomizing the fuel for mixture with the air.

8. The method of claim 1 and further comprising:
mixing the fuel with the air upstream of the catalytic oxidation unit.

9. The method of claim 1, wherein the exhaust gas has a temperature less than 230 degrees Celsius at the outlet to cool the catalytic oxidation unit.

10. The method of claim 1, wherein the at least portion of air is recycled by diverting a portion of the exhaust gas through the recycle duct to the inlet of the catalytic oxidation unit.

11. The method of claim 10, wherein at least 95% of the exhaust gas is diverted through the recycle duct to the inlet of the catalytic oxidation unit.

12. A method for startup of a catalytic oxidation unit for an aircraft gas inerting system, the method comprising:
flowing a gaseous mixture of air and a fuel into a catalytic oxidation unit, wherein a ratio of the air to the fuel entering the catalytic oxidation unit is at a relative stoichiometric ratio of oxygen to fuel between 7 and 21;
initiating a catalytic reaction of the air and the fuel;
producing an exhaust gas comprising a chemical product of catalytic oxidation; and
recycling at least a portion of the exhaust gas from an outlet of the catalytic oxidation unit to an inlet of the catalytic oxidation unit through a recycle duct;
reducing the ratio of the air to the fuel entering the catalytic oxidation unit to a relative stoichiometric ratio of oxygen to fuel between 1 and 7; and
delivering at least a portion of the exhaust gas to an ullage of a fuel tank.

13. The method of claim 12, wherein the exhaust gas has a temperature below 230 degrees Celsius at the outlet to cool catalytic oxidation unit.

14. The method of claim 12, wherein a recycle ratio relative to a flow rate of the exhaust gas is equal to or greater than 20.

15. The method of claim 12, wherein the fuel is an atomized liquid fuel.

16. An inert gas generating system comprising:
an adjustable supply of air;
a fuel tank providing an adjustable supply of liquid fuel;
a nozzle configured atomize the liquid fuel;
a catalytic oxidation unit arranged to receive the air and the liquid fuel, wherein the catalytic oxidation unit comprises:
an inlet for receiving the air and the liquid fuel; and
an outlet for delivering the air and the exhaust gas, wherein exhaust gas is a product of a reaction between the air and the liquid fuel;
a recycle duct fluidly connecting the inlet and the outlet of the catalytic oxidation unit;
an exhaust duct fluidly connecting the outlet of the catalytic oxidation unit to an ullage of the fuel tank; and
a controller configured to adjust at least one of the supply of fuel and the supply of air to the catalytic oxidation unit by way of one or more valves.

17. The system of claim 16, wherein the controller is configured to recycle only air during a portion of a startup operation of the catalytic oxidation unit.

* * * * *